United States Patent [19]

Girard et al.

[11] Patent Number: 5,324,435
[45] Date of Patent: Jun. 28, 1994

[54] DEALCOHOLIZING METHOD

[75] Inventors: Jean-Marc Girard, Payerne; Albert Duriaux, Estavayer-le-lac; Philippe Cuenat, Nyon; Michel Jaccard, Orbe, all of Switzerland

[73] Assignee: Federation Des Cooperatives Migros, Switzerland

[21] Appl. No.: 927,640

[22] PCT Filed: Dec. 13, 1991

[86] PCT No.: PCT/CH91/00266
§ 371 Date: Aug. 31, 1992
§ 102(e) Date: Aug. 31, 1992

[87] PCT Pub. No.: WO92/12232
PCT Pub. Date: Jul. 23, 1992

[30] Foreign Application Priority Data

Jan. 7, 1991 [FR] France .................. 91 00177

[51] Int. Cl.$^5$ ............................................. B01D 61/04
[52] U.S. Cl. .................... 210/636; 210/639; 210/652
[58] Field of Search ............ 426/490; 210/652, 195.2, 210/651, 639, 641, 636

[56] References Cited

U.S. PATENT DOCUMENTS 4,610,887 9/1986 Galzy et al. .................. 426/490
4,963,381 10/1990 Girard et al. .................. 426/490

FOREIGN PATENT DOCUMENTS 0162240 11/1985 European Pat. Off. .
2620129 3/1989 France .
87/03902 7/1987 PCT Int'l Appl. .

Primary Examiner—Frank Spear
Attorney, Agent, or Firm—Davis, Bujold & Streck

[57] ABSTRACT

A method in which the storage and processing of the liquid to be dealcoholized is carried out in a dealcoholization circuit in a non-oxidizing atmosphere, partial diafiltration of this un-diluted liquid in a reverse osmosis module is carried out, an exchange of water takes place to compensate partially for the loss of volume due to the separation of the permeate, by the addition of demineralized water which is totally free from any trace of chlorine, and deaerated and natural or synthetic ingredients, not extracted from the original liquid by thermic treatment, are added to the residue. In order to obtain complete desalcoholization, preconcentration of the original liquid to be dealcoholized is carried out at a temperature of between 10° and 15° C. and during processing, at least one concentration, one dialfiltration and one dilution are carried out alternately. This method is mainly used to process wine, beer and cider and allows them to retain their required standards of quality and taste.

24 Claims, No Drawings

DEALCOHOLIZING METHOD

The present invention concerns a method for dealcoholizing using reverse osmosis of an alcoholic liquid, notably wine, beer or cider, in which the storage and processing of this liquid to be dealcoholized is carried out in a dealcoholization circuit in a non-oxidizing atmosphere, in which a partial diafiltration of this liquid takes place in a reverse osmosis module, in which an exchange of water is carried out to partially compensate for the loss of volume due to separation of the permeate by means of the addition of demineralized water totally free from any trace of chlorine, and deaerated if necessary and in which natural or synthetic ingredients, not extracted from the original liquid by thermic treatment, are added to the residue.

A process of this type has already been described in the International patent application N° WO 87/03902. This process has shown itself to be quite remarkable and has given extremely interesting results, notably in the production of totally or partially dealcoholized wine in which the level of residual alcohol is of the order of 0.5 to 2%. Total dealcoholization has proved problematical due to the excessively long treatment time, which has the effect of making the process expensive and therefore unprofitable.

The method described in the French patent application published under No. 2 620 129 also concerns a method for dealcoholizing using reverse osmosis. In this method, before the diafiltration, a dilution of the initial liquid is carried out by the addition of an equal quantity of water. This water is then evacuated by a high reconcentration made at a relatively high temperature (25° to 35° C.). The introduction of this water presents many inconveniences. On the one hand if this reconcentration is carried out at a low temperature, the total duration of the dealcoholizing is greatly increased, therefore it is necessary to work at a high temperature so as to try to reduce this duration. On the other hand, concerning the taste, the fact that the reconcentration is carried out with a relatively high temperature so as not to prolong the operation produces as a consequence a loss of "vinous" elements such as the organic acids, the flavours and the salts and thus causes a decrease in the quality of the obtained product. Moreover, the fact that the concentration factor is superior to 5 strongly denatures the un-diluted wine because of chemical phenomena such as tartaric precipitations or in the case of white wines a protein instability. Finally the final dilution of the dealcoholized liquid obtained by this method affects the quality in a considerable manner.

The present invention proposes to supply a solution to these problems by allowing complete dealcoholization to take place with high output and resulting in a product which respects the required quality and taste standards.

With this aim, the method according to the invention is characterized by the fact that the original un-diluted liquid to be dealcoholized is preconcentrated, and in that during treatment at least one concentration at a low temperature, one diafiltration equally at a low temperature and one dilution and are alternately carried out.

The concentration and the diafiltration are advantageously carried out at a temperature between 10° and 15° C.

It is preferable to stabilize pH during processing.

Using the preferred method, the rate of preconcentration of the liquid to be dealcoholized is inferior to 5 and preferably between 3 and 4.

It is preferable to maintain the relation $R = Dd/Di$ in which $Dd$ represents the flow of permeate at the start of diafiltration and $Di$ the initial flow of permeate at the start of dealcoholization, at a level between 60 to 80% and preferably superior to 65%. Also using this method, the initial permeate flow $Di$ at the start of dealcoholization, is at least between 10 and 15 $l/h/m^2$ of the filtering surface, and preferably between 12.6–13 $l/h/m^2$ for white wines and between 11.6–12 1 $l/h/m^2$ for red wines.

Using the chosen method, the pH is stabilized with tartaric acid and/or tartrates if it is required to fall below 0.5% by volume of alcohol.

According to another way of carrying out the method, primary diafiltration, concentration, the main diafiltration and dilution to the final chosen volume are carried out successively.

Preferably the primary diafiltration is carried out until a volume of permeate of between 0.5 and 2% of the original wine is obtained.

Using another particularly advantageous method, concentration, diafiltration, partial dilution, reconcentration, diafiltration and dilution to the final chosen volume are carried out successively.

Using these methods, the different phases of treatment or combinations of these phases are carried out at least twice.

It is recommended to rinse and clean the membranes regularly, before processing and/or during the method.

It is preferable to carry out these rinsing and cleaning processes using special water-soluble cleaning agents. Such a solution may contain caustic soda, nitric acid or hydrogen peroxide, as well as enzyme preparations.

The whole installation should also be rinsed before the start of dealcoholization, with an aqueous solution containing clear alcohol, preferably about 11% by volume of alcohol. Using the methods described, partial or total diafiltration takes place before processing starts, acidification occurs during dealcoholization and concentration of the previously deacidified dealcoholized residue is carried out to preserve it.

During reconstitution of the dealcoholized wine, it is preferable to add ingredients whose volume is super-concentrated with respect to the initial volume of wine. Alimentary acids can also be added.

It is preferable for these alimentary acids to include lactic acid or tartaric acid and Na-Hydrogen tartrate.

Other substances, chosen from the following group, may also be added to the dealcoholized wine: glycerine, NaCl, succinic acid, citric acid, malic acid, glucose, $NaHCO_3$, $K_2CO_3$, fructose and grape juice.

It is preferable to readjust the acidity using tartaric acid, following testing of the acidity, the other ingredients having already been added.

Within the framework of this method, many tests have been carried out using membranes of the HC 50 type and with a module of 19 $m^2$. It was noted that preconcentration of non-diluted processed wine by a factor of between 2 and 5, and preferably between 3 and 4, before diafiltration, has the advantage of reducing processing time by about 35% and with about four times the quantity of permeate produced.

For example, partial dealcoholization of 1028 and 2217 litters of wine respectively was carried out following technique A with no preconcentration, and following technique B corresponding to the method described above. The results are given in the table below.

| Parameters | Technique A<br>No preconc. | Technique B<br>With preconc.<br>(rate 3.1 times) |
|---|---|---|
| Quantity of non-diluted wine processed | 1028 litters | 2217 litters |
| Process time measured | 9.5 hours | 13.25 hours |
| Time calculated for 1000 litters | 9.24 hours | 5.98 hours |
| $R = \dfrac{Q \text{ permeate obtained}}{Q \text{ processed wine}}$ | 5.5 | 1.39 |

The time gained in case B is 35%. The gain in R is four times.

These results were only exact on condition that the initial flow across the membranes, at starting time, was not less than 12.6 l/h/m², i.e. a rate of flow of 240 l/h for 19 m² of membranes surface, and on condition that the concentration rate, before diafiltration, did not cause the flow of permeate to fall below 65–70%, and more specifically 70%, of its initial value at starting time. In other words it is necessary that $$\frac{D_d}{D_i} \geq 65\text{--}70\%$$

where:

$D_d$ represents the flow of permeate at the start of diafiltration, and $D_i$ represents the initial flow of permeate at method starting time.

On the other hand, preconcentration of wine which has not been diluted before diafiltration, by a factor superior to 3–4 times, has the effect of denaturing the dealcoholized wine and is not to be recommended from an organoleptic point of view. A test was carried out on 10,560 litters of white wine which was concentrated 7.5 times before diafiltration. The residue obtained was brown and cloudy. After reconstitution, the dealcoholized wine obtained, had a stale taste which had not been found in wine obtained from a 3 times concentrated wine. The results obtained using composite membranes, 19 m² in surface area, using white wine, are indicated below.

| Parameters | Test 1 | Test 2 | Test 3 |
|---|---|---|---|
| Quant. dealcoholized (un-diluted) | 20922 l | 15325 l | 18045 l |
| Flow of permeate start $D_i$ | 240 l/h | 350 l/h | 180 l/h |
| Flow of permeate start dia $D_d$ | 200 l/h | 260 l/h | 150 l/h |
| Relation $D_d/D_i$ % | 83,3 | 74,3 | 83,3 |
| Membrane treatment | no | yes | yes |
| Total desalc. time | 149.75 h | 123.17 h | 243 h |
| Time per 1000 l | 7.16 h | 8.04 h | 13.46 h |
| Relation $\dfrac{Q \cdot \text{permeate}}{Q \cdot \text{initial wine}}$ | 1.96 | 1.60 | 2.1 |

From which it can be deduced that:

1.-the preconcentration of non-diluted wine must not exceed 2 to 5 and preferably 3 to 4 times due to organoleptic depreciation.

2.-the relation $R = D_d/D_i$ must be between 60–80% and preferably above 65–70% to avoid diminution in performance.

3.-the initial flow of permeate at the start of dealcoholization of the non-diluted wine, should be between at least 10 and 15 l/h/m² and preferably between 12.6–13 l/h/m² for white wines and 11.6—12 l/h/m² for the reds.

A considerable saving of time was also noted when the different processing phases were alternated during the dealcoholization operation. With this aim, the following procedure was adopted:

a. During the first test, primary diafiltration of non-diluted wine was carried out, until a volume of permeate between 0.5 and 2% was obtained from the original wine, followed by concentration and the principal diafiltration, followed by dilution.

b. During the second test, concentration was carried out before diafiltration, followed by partial dilution, reconcentration, diafiltration and final dilution.

Other combinations can be envisaged and the phases cited above can be repeated several times.

Finally, to guarantee an optimal yield of dealcoholized wine, i.e. to reduce the duration of the operation to a minimum and avoid the formation of bad flavours in the dealcoholized wine, it was necessary to introduce a cleaning procedure which combined a certain number of specific operations using a range of chemical products with the aim of ensuring adequate cleaning of the membranes, particularly after dealcoholization of red wine.

To guarantee an initial flow of permeate of the order of 11.6 l/h/m² for red wines and 12.6 l/h/m² for white wines, a combination of chemical processes was employed which was destined to restore adequate permeability to the membranes in order to ensure the desired rate of flow. Initially, rinsing with nitric acid was carried out. For 115 litters of the installation's water, 624 ml of 65% HNO3 was added in a processing vat and this mixture was circulated at a pressure of around 10 to 12 bars, for a minimum of 30 minutes. Rinsing in running water for at least fifteen minutes was then carried out. After this water rinse, a solution of hydrogen peroxide was prepared by adding 160 ml of 35% hydrogen peroxide to 115 liters of the installation's water and causing this to circulate at a pressure of 10 to 12 bars, for thirty minutes. Rinsing in water was then performed as before. During the dealcoholization method, as soon as the flow of permeate tends to fall below 60 to 80%, or preferably, below 65% to 70%, of its initial value, an intermediate method was carried out on the membranes, consisting of:

1. For white wines, cleaning the membranes using a solution containing 40 litters of hot water, at 30° C., 810 g of "Ultrasil 53", marketed by Henkel, and 50 g of 100% caustic soda in powder form.

2. For red wines, a rinse in nitric acid, followed by the hydrogen peroxide-water solution previously described.

Between each dealcoholization operation involving 20,000 litters of white or red wine, the membranes should be cleaned appropriately. The parameters for these operations are resumed in the following table:

| Processing product process | Dose (pour 115 lt/ 55 bac, 60 inst.) | Pressure/Bar (module entry) | Duration (minutes) | Temperature °C. (maximum) (heat water as required with steam pipe) |
|---|---|---|---|---|
| Rinse (tap water) | — | 10–12 | 15 | — |
| Ultrasil 15 | 1,000 kg | 10–12 | 5–10 | 40 |
| Rinse (tap water) | — | 10–12 | 15 | — |
| Ultrasil 55 | 0,575 kg | 10–12 | 10 + leave 12 hours | 30–35 |
| Rinse (tap water) | — | 10–12 | 15 | — |
| Ultrasil 75 | 0,345 kg | 10–12 | 20 | 40 |
| Rinse (tap water) | — | 10–12 | 15 | — |
| Ultrasil 15 | 0,750 kg | 10–12 | 30–40 | 40 |
| Rinse (tap water) | — | 10–12 | 15 | — |

By means of this procedure the initial yield capacity was preserved intact for a module in uninterrupted operation for about six years.

To avoid introducing bad flavours into dealcoholized wine, such as staleness, cork and mould, the module and tubing should be rinsed prior to each dealcoholization method with an aqueous solution containing about 11% by volume of clear alcohol constituted, for example, of 94% ethanol and 2% by volume of propylic alcohol. The rinsing alcohol is recirculated in the module and tubing for at least 15 minutes before being followed by the wine to be dealcoholized. No water rinse, which would risk the reintroduction of doubtful flavours, should be carried out between this alcohol rinse and the start of the dealcoholization method.

In addition to avoid oxydation and stale flavours in the dealcoholized wines, it is advantageous to previously dearate the demineralized water to be introduced into the method, until its oxygen content is reduced to less than 0.1 mg/l.

For transport and storage of the residue, it may be useful to concentrate it. With this aim, and so as to avoid disturbing the product as soon as it starts to precipitate, it is preferable to carry out partial or complete deacidification of the wine to be dealcoholized, before concentration and dealcoholization.

Tests were carried out on red Algerian wine which had a level of 10.8% by volume of alcohol and a level of total titratable acidity of 5.56 g/l, a pH of 3.25 and tartaric acidity of 2.5 g/l. Deacidification was carried out according to normal cellar techniques to bring it to a total acidity level of 3.10 g/l, a pH of 4.10 and tartaric acidity of 0.8 g/l. This deacidified wine was dealcoholized normally and concentrated 3.5 times. The residue was preserved for two and a half months at 10° C. with no signs of disturbance or formation of precipitate. It was then reconstituted. With this aim, one part of the concentrated residue was taken and two parts of water were added to it along with the usual ingredients in compensation for the acidity lost during the method of deacidification. A comparative tasting showed that a sample not deacidified before dealcoholization, and reconstituted immediately after dealcoholization had absolutely the same taste as the sample which had been deacidified in advance.

To ensure the preparation of dealcoholized wine with a level of alcohol of less than 0.5% by volume, the same technique as those previously described were used, with the introduction of two supplementary characteristics as follows:

α) Acidification of the residue was carried out during dealcoholization. It was noted that during dealcoholization to a level below 0.5% by volume of alcohol, the loss of acidity for the wine, using membranes of the HC 50 type, can be sufficiently high for raise the pH of the wine which causes a considerable modification of its qualities, particularly its colour, stability, physical and bacteriological qualities etc. To avoid these phenomena, the wine to be dealcoholized is reinjected with acids, periodically, during the dealcoholization method, in the form of, for example, tartaric acid, tartrates or other alimentary acids, in order to stabilize the pH. For example, 15.130 kg of red Algerian wine containing 11.4% by volume of alcohol, was processed. The dealcoholization method caused the volume of alcohol to fall to 3.8% by means of preconcentration of the non diluted wine to a level equal to 2. From the moment when this volume of alcohol was reached, 2.0 g of tartaric acid was added per litre of concentrated residue in circulation. From this moment, the concentration undergoing dealcoholization was increased to a level equal to 5 without however provoking any visible modification to the wine's acidity. Diafiltration and dilution were then carried out according to the previously described method, and a dealcoholized red wine was obtained which had a final alcohol level of less than 0.03% by volume, the verification being carried out by enzyme analysis. β) Modification of the dealcoholization method is carried out when the alcohol level falls below 0.5% by volume of alcohol. When the volume of alcohol falls below 1%, it has been noted that it is preferable to alternate the concentration, dilution and diafiltration phases to terminate dealcoholization. For dealcoholized wines at a superior level, it is preferable to end the dealcoholization method with dilution following diafiltration.

For example, 846 l of red Algerian wine with a level of 12.2% by volume of alcohol was processed to reduce this volume of alcohol to 0.02%. The duration of the phases of this method are noted in the following table:

| Phases | Red Wine Module 19 m²/HC50 duration | Red Wine Module 1.98 m² converted value for module 19 m² duration |
|---|---|---|
| 1) Preconcentration (2x) on the non-diluted wine | 2.67 h | 2.22 h |
| 2) Diafiltration | 5.33 h | 17.96 h |
| 3) Dilution | 1.75 h | 3.31 h |
| 4) Concentration | 4.50 h | — |
| 5) Dilution | 0.33 h | — |
| Total | 14.58 h | 23.49 h |
| For 1,000 l | 17.23 h | 27.80 h |

It was noted that the three initial phases, resulting in a final alcohol level of 0.02%, took 23.5 hours, or 27.8 hours for 1,000 litters. Consequently, the observed time saving is of the order of 37%.

Other combinations of the concentration, diafiltration and dilution phases may be envisaged.

Concerning reconstitution of the wine, and notably the flavour of this wine following the dealcoholization operation, in other words, to improve the organoleptic quality of the dealcoholized wine and give it a less watery taste, it is a good idea to increase the quantity of ingredients with relation to the initial volume of wine processed. Instead of rediluting the residue at the end of dealcoholization to the original level of the processed wine, a specified percentage of the volume is deduced from this initial level, and will not be included in the final wine. This percentage is, for example, equal to the value of the volume occupied by the alcohol in the wine to be dealcoholized. The ingredients to be added to the residue have a volume proportional to the initial volume of the processed wine, or superior to this volume and no longer proportional to the volume of the residue. In this way, the dealcoholized wine will have a greater proportion of vinous elements.

For example, if 10,000 litters of wine containing 11% of alcohol to be dealcoholized is processed, the volume of alcohol contained in this wine being 1,100 litters, the volume of dealcoholized wine obtained is 8,900 litters. Using the previous method, these 8,900 litters were made up to 10,000 litters by the addition of water and the ingredients were calculated on the basis of 10,000 litters. Using the method described above, the residue is not re-diluted and the quantity of ingredients added to the 8,900 litters of dealcoholized wine obtained, is based on 10,000 litters. Of course, the dosage of ingredients can be increased in a manner proportional to a larger volume than that of the original wine for dealcoholization. Nevertheless, experience shows that the addition of supplementary ingredients corresponding to the volume of alcohol contained in the initial volume of wine is enough to eliminate the watery taste due to loss of alcohol.

As previously mentioned, during the dealcoholization operation, part of the acidity must be compensated for, notably to give body to the dealcoholized wine. During reconstitution at the end of dealcoholization, alimentary acids can be added to the residue.

For example, lactic acid can be used in quantities of 0.65 g/l calculated on the initial volume of wine, for red wines, and of the order of 2.6 g/l calculated on the initial volume for rosé white wines.

Tartaric acid and Na-Hydrogen tartrate can also be added in sufficient quantities to achieve a total level of titratable acidity of the order of 7.4 g/l for example, in the dealcoholized wine. To do this, the residue in the reconstitution vat, restored to the previously calculated volume, is mixed with concentrated grape juice in a quantity approximately equal to 49.7 g/l of the original wine, fructose, in a quantity approximately equal to 26.5 g/l of the original wine, lactic acid as previously indicated and sodium hydrogen tartrate in the above-mentioned quantity.

This entire vat is then mixed for about ¼ to ½ an hour so that the mixture is homogeneous. A sample is then taken to verify the title.

The difference in acidity between the measured title and the desired title, is made up with tartaric acid. For example, 83 kg of tartaric acid was added to increase the acidity of 11,630 litters of dealcoholized wine from 5.6 g/l to 7.5 g/l.

Other tartaric salts have been tried, but experience has shown that K-Hydrogen tartrate is not suitable due to its insolubility in the wine, and that K-Na tartrate gives the wine a soapy, chemical taste in quantities above 80 mg/l.

It was noted that the level of sodium in the dealcoholized wine thus reconstituted, even after the addition of Na-Hydrogen tartrate, had not significantly increased with respect to the original wine.

During reconstitution, other ingredients may be added to obtain special effects. These ingredients, as well as the maximum levels which should be exceeded for organoleptic reasons, are given in the following table:

| Ingredients | Maximum levels |
| --- | --- |
| glycerine | 2.2–2.5 g/l |
| NaCl | 0.13 g/l |
| succinic acid | 0.30 g/l |
| 1 H2O citric acid (monohydrated) | 0.15 g/l monohydrated |
| malic acid | 0.60 g/l |
| glucose | 9 g/l |
| NaHCO3 | 0.45 g/l |
| K2CO3 | 0.45 g/l |

One possible use for the alcohol produced by the method is in the vinegar industry. In this industry, alcohol diluted to 10 or 12% by volume is used. During the dealcoholization method, it would be possible to collect a fraction of the permeate, the alcohol level of which is between 7 and 8%, directly, and to concentrate this alcohol until the level by volume reaches 10 to 15%. The cost of the operation is relatively modest, since the equipment used is not expensive.

We claim:

1. A method for dealcoholization by reverse osmosis of an alcoholic liquid, comprising one of wine, beer and cider, wherein storage and processing of this liquid to be dealcoholized is carried out in a dealcoholization circuit in a non-oxidizing atmosphere, comprising the steps of:
    (a) preconcentrating said liquid by extraction of water and alcohol from said liquid by reverse osmosis at a low temperature to obtain a first permeate and a first retentate,
    (b) operating a diafiltration of said first retentate by reverse osmosis at a low temperature to obtain a second permeate and a second retentate, with partly compensating for loss of volume of retentate by addition of demineralized water which is completely free of any traces of chlorine,
    (c) diluting said second retentate to obtain a liquid at least partly dealcoholized,
    (d) repeating steps (a), (b) and (c) at least once with said liquid at least partly dealcoholized.

2. a method as in claim 1, wherein said low temperature is between about 10° C. and about 15° C.

3. A method as in claim 1, wherein the pH is stabilized after step (a).

4. A method as in claim 3, wherein the pH is stabilized using one of tartaric acid, tartrates and a combination thereof.

5. A method as in claim 1, wherein in step (a) the ratio of preconcentration of the liquid to be dealcoholized is less than about 5.

6. A method as in claim 1, wherein a flow ratio, the rate of flow of permeate and the initial rate of flow of permeate at the start of diafiltration, is between about 60% and about 80%.

7. A method as in claim 1, wherein the initial rate of flow of permeate, at the start of diafiltration, is between about 10 and about 15 l/h/m² of filtering surface.

8. A method as in claim 1, wherein step (a) comprises a primary diafiltration and a concentration, and step (b) comprises a principal diafiltration.

9. A method as in claim 8, wherein the primary diafiltration is carried out until a volume of permeate of between about 0.5% and about 2% of the original liquid is obtained.

10. A method as in claim 1, wherein membrane rinsing and cleaning operations are carried out periodically.

11. A method as in claim 10, wherein said operations are carried out using aqueous solutions.

12. A method as in claim 11, wherein the aqueous solution used for rinsing and cleaning contains caustic soda.

13. A method as in claim 11, wherein the aqueous solution used for rinsing and cleaning contains nitric acid.

14. A method as in claim 11, wherein the aqueous solution used for rinsing and cleaning contains hydrogen peroxide.

15. A method as in claim 1, wherein the whole installation is rinsed before starting step (a), using an aqueous solution containing pure alcohol.

16. A method as in claim 15, wherein the rinsing solution contains about 11% by volume of alcohol.

17. A method as in claim 1, wherein partial or total diafiltration is carried out before step (a) and acidification is carried out during a later one of said steps.

18. A method as in claim 17, wherein the previously deacidified, dealcoholized residue is concentrated for preservation purposes.

19. A method as in claim 1, wherein during reconstitution of the dealcoholized wine, ingredients are introduced, whose volume is super concentrated with respect to the initial volume of wine.

20. A method as in claim 1, wherein during reconstitution of the dealcoholized wine, alimentary acids are introduced.

21. A method as in claim 20, wherein said alimentary acids include lactic acid.

22. A method as in claim 20, wherein said alimentary acids include a mixture of tartaric acid and Na-Hydrogen tartrate.

23. A method as in claim 1, wherein substances chosen from the following group are introduced into the dealcoholized liquid: glycerine, NaCl, succinic acid, citric acid, malic acid, glucose, $NaHCO_3$, $K_2CO_3$, fructose and grape juice.

24. A method as in claim 23, wherein readjustment of the acidity is carried out, using tartaric acid, following verification of this acidity and the addition of the other ingredients.

* * * * *